P. SHAW.
Air-Tight Dish.
No. 160,286. Patented March 2, 1875.
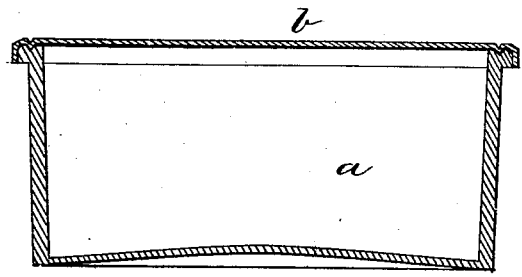
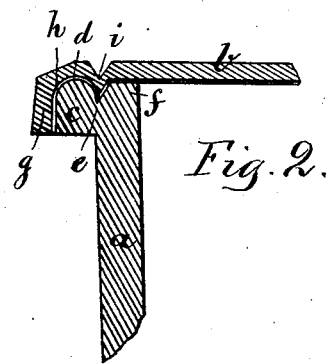
Witnesses:
John R. Heard.
Francis Allen.
Inventor:
Philander Shaw.
by Alban Andrén,
his atty.

UNITED STATES PATENT OFFICE.

PHILANDER SHAW, OF SCITUATE, MASSACHUSETTS.

IMPROVEMENT IN AIR-TIGHT DISHES.

Specification forming part of Letters Patent No. 160,286, dated March 2, 1875; application filed December 8, 1874.

*To all whom it may concern:*

Be it known that I, PHILANDER SHAW, of Scituate, in the county of Plymouth and State of Massachusetts, have invented certain new and useful Improvements in Air-Tight Butter-Dishes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to improvements in air-tight butter-dishes or jars for putting up butter or similar articles of food for the table or market. It is a well-known fact that nice butter is very sensitive to odors of vegetables or other articles of food, and it is therefore of the greatest importance that it should be transported and kept, when not on the table, in air-tight jars or dishes, so as to prevent it from being impregnated with such foreign odors. This is the object of my invention, for which purpose I construct my improved air-tight jar or dish as follows:

On the accompanying drawing, Figure 1 represents a central longitudinal section of my improved dish with cover attached, and Fig. 2 represents an enlarged sectional view of a part of the same.

Similar letters refer to similar parts wherever they occur on the different parts of the drawings.

$a$ represents the dish or jar, which I make of glass or similar material; and $b$ represents a metallic cover for the same. The upper part of the dish $a$ is made with an annular ring, $c$, curved in its upper edge $d$, as shown, and provided with an annular V-shaped groove, $e$, and an annular plain edge, $f$. The cover $b$ is made to fit the upper and outer part of the dish, and is for this purpose provided with an annular ring, $g$, curved annular groove $h$, and V-shaped annular edge $i$ on its outer side, as fully shown in Fig. 2. A suitable cement or packing substance is applied to the inside of the parts $g$ $h$ of the cover $b$ when the dish is to be sealed, when the curved groove $h$ and V-shaped annular edge $i$ prevent the said cement or packing substance from being forced over the plain edge $f$ into the butter contained in the dish or jar $a$.

The construction of this my improved dish and cover allows of the removal of the cover very easily when desired, and after a part of the butter is consumed the cover can be instantaneously replaced in the original position. In this manner I am able to transport butter, &c., to the market without danger of its being contaminated with the odors and tastes of foreign substances with which it may be brought in contact.

I do not claim as my invention a cover for fruit-cans composed of two parts, one of which makes an air-tight joint on the inside of the upper flange, and the other one making an air-tight joint on the outside of the said upper flange, as my invention is composed of one single cover, so constructed as to form an air-tight connection with the dish, both on the inside and on the outside of the upper flange; but What I wish to secure by Letters Patent and claim is—

In combination with the glass dish A, with its annular curved flange $c$ $d$, annular V-shaped groove $e$, and ring $f$, the metallic cover $b$, with its annular V-shaped lip $i$ and annular flange $g$, as and for the purpose set forth and described.

In testimony that I claim the foregoing as my own invention I have affixed my signature in presence of two witnesses.

PHILANDER SHAW.

Witnesses:
ALBAN ANDRÉN,
JOHN R. HEARD.